United States Patent [19]
Bjerede et al.

[11] Patent Number: 5,648,985
[45] Date of Patent: Jul. 15, 1997

[54] UNIVERSAL RADIO ARCHITECTURE FOR LOW-TIER PERSONAL COMMUNICATION SYSTEM

[75] Inventors: Bjorn E. Bjerede, La Jolla, Calif.; Joseph T. Lipowski, Boxborough, Mass.; Benny Madsen; Sheldon L. Gilbert, both of San Diego, Calif.; James E. Petranovich, Encinitas, Calif.

[73] Assignee: Rockwell Semiconductor Systems, Inc., Newport Beach, Calif.

[21] Appl. No.: 348,359

[22] Filed: Nov. 30, 1994

[51] Int. Cl.$^6$ .................................................. H04B 1/38
[52] U.S. Cl. ...................... 375/219; 375/273; 375/283; 375/302; 375/323; 455/84; 455/575; 455/102; 455/118; 455/142; 455/323; 329/316; 332/119; 370/280; 370/281
[58] Field of Search .................................. 329/300, 302, 329/304, 306, 307, 316; 348/554, 555; 370/11, 12, 24, 29, 30, 32, 39, 50, 75; 375/216, 219, 222, 223, 269, 272, 273, 279, 283, 295, 302, 316, 322, 323, 329, 330, 334, 336; 455/73, 84–86, 89, 102, 118, 142, 143, 313, 314–316, 323; 330/1 R; 332/119

[56] References Cited

U.S. PATENT DOCUMENTS

| | | | |
|---|---|---|---|
| 5,233,643 | 8/1993 | Naeini et al. | 379/59 |
| 5,377,229 | 12/1994 | Wilson et al. | 375/223 |
| 5,465,409 | 11/1995 | Borras et al. | 455/260 |
| 5,475,677 | 12/1995 | Arnold et al. | 370/29 |

OTHER PUBLICATIONS

"Radio Equipment and Systems (RES); Digital European Cordless Telecommunications (DECT) Common interface," European Telecommunications Standards Institute, 1992.

Cox, D., "Wireless Network Access for Personal Communications", IEEE Communications Magazine, vol. 30, pp. 96–115, No. 12, Dec. 1992.

Madsen, B. and Fague, D., "Radios for the Future: Designing for DECT", RF design, Apr. 1993. pp. 48–53.

*Primary Examiner*—Stephen Chin
*Assistant Examiner*—Amanda T. Le
*Attorney, Agent, or Firm*—Edward W. Callan

[57] ABSTRACT

An integrated circuit chip set is provided for use in a radio communication system in which a modulated digital input signal is processed for transmission and a modulated signal received from an antenna is processed to provide an output signal, wherein the modulation of the signals is either QPSK or FSK and the signal transmission and reception is by either TDD or FDD. The chip set includes an IF integrated circuit chip for processing a digital input signal to convert the digital input signal into an analog input signal and to provide the input signal at an intermediate frequency and for processing a received signal at the intermediate frequency to down convert the frequency thereof and to provide an output signal from the down-converted received signal; and an RF integrated circuit chip for processing the input signal provided by the IF chip at the intermediate frequency to up convert the frequency thereof to a transmission frequency and for processing a received signal provided at the reception frequency to down convert the frequency thereof to the intermediate frequency. The IF chip includes switches and terminals for enabling the IF chip to be connected for processing by the IF chip of QPSK-modulated signals or to be connected for processing by the IF chip of FSK-modulated signals; and the RF chip includes terminals for enabling the RF chip to be connected for processing by the RF chip of TDD transmitted and received signals or to be connected for processing by the RF chip of FDD transmitted and received signals.

19 Claims, 3 Drawing Sheets

UNIVERSAL RADIO ARCHITECTURE FOR LOW-TIER PERSONAL COMMUNICATION SYSTEM

BACKGROUND OF THE INVENTION

The present invention generally pertains to radio communication systems and is particularly directed to an improvement in radio architecture for low tier personal communication systems.

Low-tier personal communication systems utilize a variety of modulation schemes and generally use either a time-division duplex (TDD) or a frequency-division duplex communication scheme. The modulation schemes generally are either quadrature phase shift keying (QPSK) or frequency shift keying (FSK). The QPSK modulation schemes generally include π/4 QPSK and π/4 DQPSK; and the FSK modulation schemes generally include GFSK and GMSK (Gaussian minimum shift keying).

Chip sets presently used for personal communication systems include an intermediate frequency (IF) integrated circuit chip for processing a digital input signal to convert the digital input signal into an analog input signal and to provide the input signal at an intermediate frequency and for processing a received signal at the intermediate frequency to down convert the frequency thereof and to provide an output signal from the down-converted received signal; and a radio frequency (RF) integrated circuit chip for processing the input signal provided by the IF chip at the intermediate frequency to up convert the frequency thereof to a transmission frequency and for processing a received signal provided at the reception frequency to down convert the frequency thereof to the intermediate frequency. In the prior art, these chips are customized in accordance with whether the modulation scheme is QPSK or FSK and in accordance with whether the communication scheme is TDD or FDD.

SUMMARY OF THE INVENTION

The present invention provides an integrated circuit chip set for use in a radio communication system in which a modulated digital input signal is processed for transmission and a modulated signal received from an antenna is processed to provide an output signal, wherein the modulation of the signals is either QPSK or FSK and the signal transmission and reception is by either TDD or FDD, the chip set comprising an IF integrated circuit chip for processing a digital input signal to convert the digital input signal into an analog input signal and to provide the input signal at an intermediate frequency and for processing a received signal at the intermediate frequency to down convert the frequency thereof and to provide an output signal from the down-converted received signal; and an RF integrated circuit chip for processing the input signal provided by the IF chip at the intermediate frequency to up convert the frequency thereof to a transmission frequency and for processing a received signal provided at the reception frequency to down convert the frequency thereof to the intermediate frequency; wherein the IF chip and the RF chip in combination include means for providing the input signal at said intermediate frequency when the modulation of the digital input signal is QPSK modulated and for providing the input signal at said intermediate frequency and/or at the transmission frequency when the modulation of the digital input signal is FSK modulated; and means for sampling the down-converted received signal to provide said output signal when the down-converted received signal is QPSK modulated and for demodulating the down-converted received signal to provide said output signal when the down-converted received signal is FSK modulated; and wherein the IF chip includes switches and terminals for enabling the IF chip to be connected for said processing by the IF chip of QPSK-modulated signals or to be connected for said processing by the IF chip of FSK-modulated signals; and wherein the RF chip includes terminals for enabling the RF chip to be connected for said processing by the RF chip of TDD transmitted and received signals or to be connected for said processing by the RF chip of FDD transmitted and received signals.

The present invention further provides an IF chip as described above.

The present invention also provides an RF chip as described above.

Additional features of the present invention are described with reference to the detailed description of the preferred embodiments.

BRIEF DESCRIPTION OF THE DRAWING

In the Drawing, reference numerals 1 through 18 designate various terminals of the respective chips, with some of the same numerals being used to designate different terminals of different chips.

DETAILED DESCRIPTION

Figure 1:
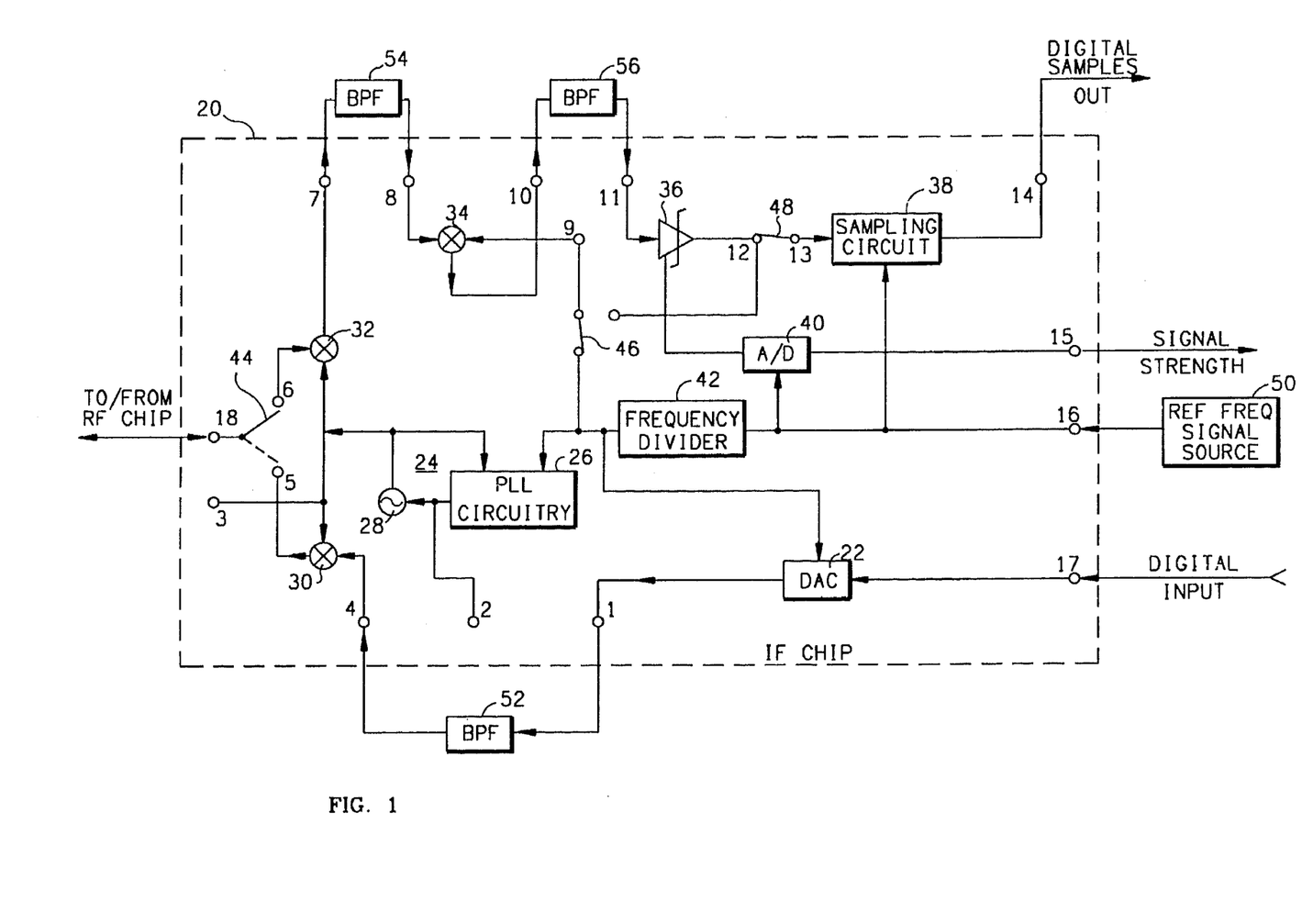
FIG. 1 is a block diagram of a preferred embodiment of an IF chip according to the present invention that is connected for processing QPSK-modulated signals.
Figure 2:
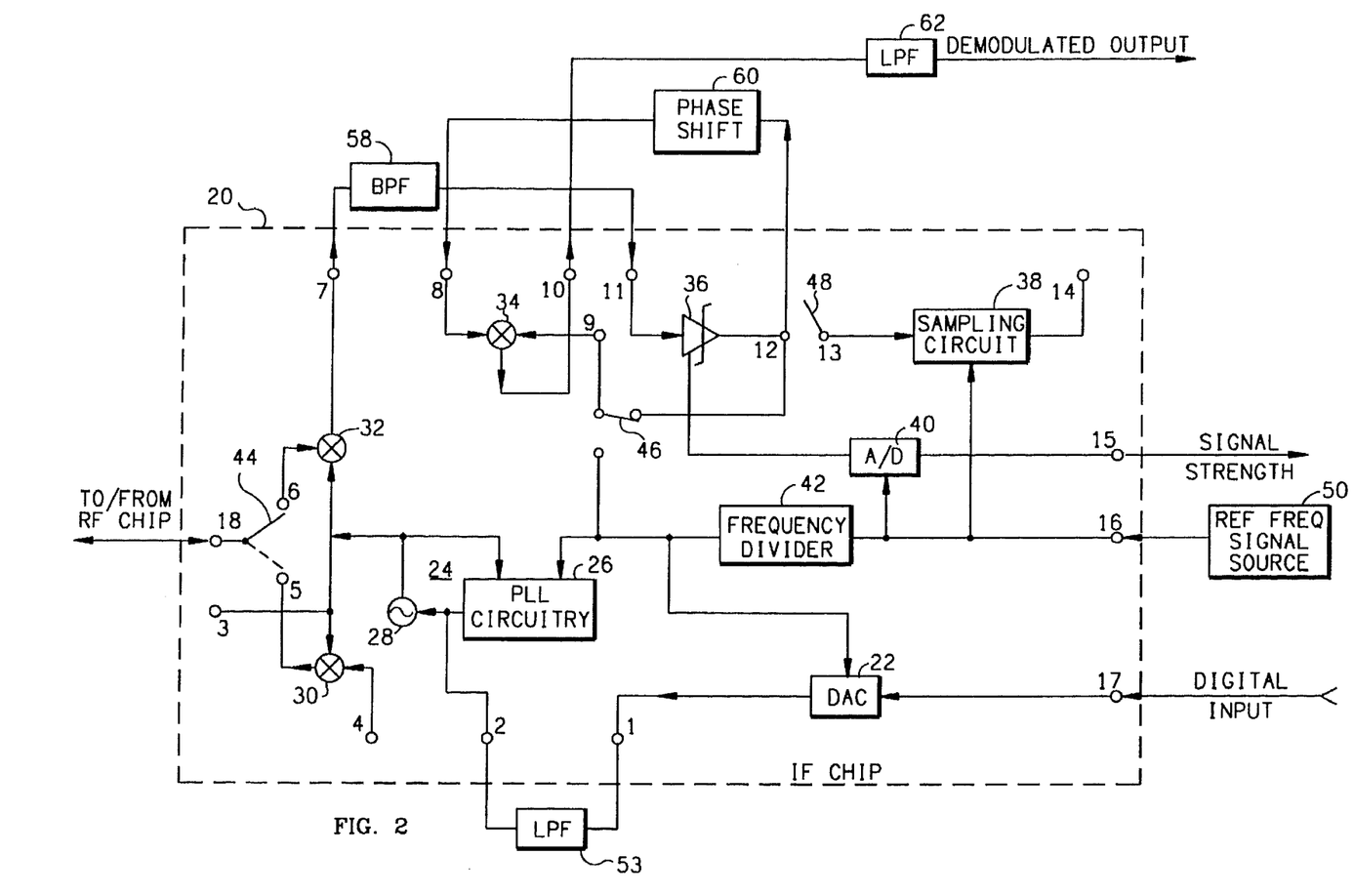
FIG. 2 is a block diagram of a preferred embodiment of an IF chip according to the present invention that is connected for processing FSK-modulated signals.

Referring to FIGS. 1 and 2, a preferred embodiment of the IF chip 20 includes a digital-to-analog converter (DAC) 22, a phase-locked loop (PLL) 24 including PLL circuitry 26 and a phase-locked oscillator 28, a first mixer 30, a second mixer 32, a third mixer 34, a limiting amplifier 36, a sampling circuit 38, an analog-to-digital (A/D) converter 40, a frequency divider 42, a first switch 44, a second switch 46, a third switch 48 and eighteen terminals 1–18. The frequency divider 42 may be either a programmable frequency divider or a frequency divider that divides by a fixed, predetermined quotient, such as two, three or four.

The input of the DAC 22 is connected to a seventeenth terminal 17 of the IF chip 20 and the output of the DAC is coupled to a first terminal 1 of the IF chip. The DAC 22 converts a digital input signal provided at the seventeenth terminal 17 into an analog input signal, which is provided from the output of the DAC 22 to the first terminal 1 of the IF chip.

The input of the phase-locked oscillator 28 is connected to a second terminal 2 of the IF chip 20 and the output of the phase-locked oscillator 28 is connected to a third terminal 3 of the IF chip.

The first mixer 30 has one input connected to the output of the phase-locked oscillator 28, a second input connected to a fourth terminal 4 of the IF chip 20 and an output connected to a fifth terminal 5 of the IF chip.

The second mixer 32 has one input connected to a sixth terminal 6 of the IF chip 20, another input connected to the output of the phase-locked oscillator 28 and an output connected to a seventh terminal 7 of the IF chip 20.

The third mixer 34 has one input connected to an eighth terminal 8 of the IF chip 20, another input connected to a ninth input terminal 9 of the IF chip 20 and an output connected to a tenth terminal 10 of the IF chip.

The limiting amplifier 36 has an input connected to an eleventh terminal 11 of the IF chip 20 and an output connected to a twelfth terminal 12 of the IF chip.

The sampling circuit 38 has an input connected to a thirteenth terminal 13 of the IF chip 20 and an output connected to a fourteenth terminal 14 of the IF chip.

The A/D convertor 40 has an input connected to the limiting amplifier 36 and an output connected to a fifteenth terminal 15 of the IF chip 20 for providing at the fifteenth terminal 15 of the IF chip 20 a digital signal indicating the strength of the signal provided at the input of the limiting amplifier 36.

Clocking signals for the sampling circuit 38 and the A/D converter 40 are provided thereto via a sixteenth terminal 16 of the IF chip 20 by an external reference-frequency signal source 50. Clocking signals for the DAC 22 and the PLL circuitry 26 are provided thereto via the frequency divider 42 and the sixteenth terminal 16 of the IF chip 20 by the external reference-frequency signal source 50.

The first switch 44 of the IF chip 20 enables an input/output (I/O) terminal 18 of the IF chip to be coupled to either the fifth terminal of the IF chip or the sixth terminal of the IF chip.

The second switch 46 of the IF chip 20 enables the ninth terminal 9 of the IF chip to be connected to either the twelfth terminal 12 of the IF chip or the reference frequency signal source 50 via the frequency divider 42 and the sixteenth terminal 16 of the IF chip.

The third switch 48 of the IF chip 20 enables the thirteenth terminal 13 of the IF chip to be either open or connected to the twelfth terminal 12 of the IF chip.

When the sixth terminal 6 of the IF chip 20 receives the received signal at the intermediate frequency, the second mixer 32 of the IF chip down converts the frequency of the received signal from the intermediate frequency and provides the down-converted signal at the seventh terminal 7 of the IF chip.

Referring to FIG. 1, in order to enable the IF chip 20 to process either a QPSK-modulated digital input signal or an FSK-modulated digital input signal provided to the seventeenth terminal 17 of the IF chip, the first terminal 1 of the IF chip is coupled by a first bandpass filter (BPF) 52 to the fourth terminal 4 of the IF chip, whereby the IF chip is connected for enabling the first mixer 30 of the IF chip to mix the output of the phase-locked oscillator 28 with the analog input signal provided at the first terminal 1 of the IF chip by the DAC 22 and provide the input signal at the intermediate frequency to the fifth terminal 5 of the IF chip.

Referring to FIG. 2, in order to enable the IF chip 20 to process an FSK-modulated digital input signal provided to the seventeenth terminal 17 of the IF chip, the first terminal 1 of the IF chip is coupled by a low-pass filter (LPF) 53 to the second terminal 2 of the IF chip, whereby the IF chip is connected for enabling the input of the phase-locked oscillator 28 to be modulated with the analog input signal provided at the first terminal 1 of the IF chip by the DAC 22 and the input signal is provided at the intermediate frequency from the output of the phase-locked oscillator 28 to the third terminal 3 of the IF chip.

In an alternative embodiment also described with reference to FIG. 2, in order to enable the IF chip 20 to process an FSK-modulated digital input signal provided to the seventeenth terminal 17 of the IF chip, the first terminal 1 of the IF chip is coupled by a low-pass filter 53 to the second terminal 2 of the IF chip for enabling the input of the phase-locked oscillator 28 to be modulated with the analog input signal provided at the at the first terminal 1 by the DAC 22 and the fourth terminal 4 is connected to the output of the frequency divider 42 (connection not shown) for enabling the first mixer 30 of the IF chip to mix the output of the phase-locked oscillator 28 with the reference-frequency signal provided at the output of the frequency divider 42, whereby the IF chip is connected for providing the input signal from the output of the first mixer 30 of the IF chip to the fifth terminal 5 of the IF chip at the intermediate frequency.

Referring again to FIG. 1, in order to enable the IF chip 20 to process a QPSK-modulated down-converted received signal provided to the seventh terminal 7 of the IF chip 20 by the second mixer 32 of the IF chip, the seventh terminal 7 of the IF chip is coupled by a second bandpass filter 54 to the eighth terminal 8 of the IF chip, the ninth terminal 9 of the IF chip is coupled by the second switch 46 of the IF chip to the reference-frequency signal source 50 via the frequency divider 42, the tenth terminal of the IF chip is coupled by a third bandpass filter 56 to the eleventh terminal of the IF chip and the twelfth terminal of the IF chip is coupled by the third switch 48 of the IF chip to the thirteenth terminal of the IF chip, whereby the IF chip 20 is connected for enabling the third mixer 34 of the IF chip to further down-convert the received signal and for enabling the limiting amplifier 36 and the sampling circuit 38 to sample the downconverted received signal and provide the sampled signal as a digital output signal to the fourteenth terminal 14 of the IF chip.

Referring again to FIG. 2, in order to enable the IF chip 20 to process an FSK-modulated down-converted received signal provided to the seventh terminal 7 of the IF chip 20 by the second mixer 32 of the IF chip, the seventh terminal 7 of the IF chip is coupled by a fourth bandpass filter 58 to the eleventh terminal 11 of the IF chip, and the twelfth terminal 12 of the IF chip is coupled to the eighth terminal 8 of the IF chip through a phase-shifting element 60 and connected directly to the ninth terminal 9 of the IF chip, whereby the IF chip 20 is connected for enabling the limiting amplifier 36, the phase-shifting element 60 and the third mixer 34 of the IF chip to demodulate the down-converted received signal and provide the demodulated signal at the tenth terminal 10 of the IF chip. A low-pass filter 62 is connected to the tenth terminal 10 of the IF chip for filtering the demodulated output signal.

Figure 3:
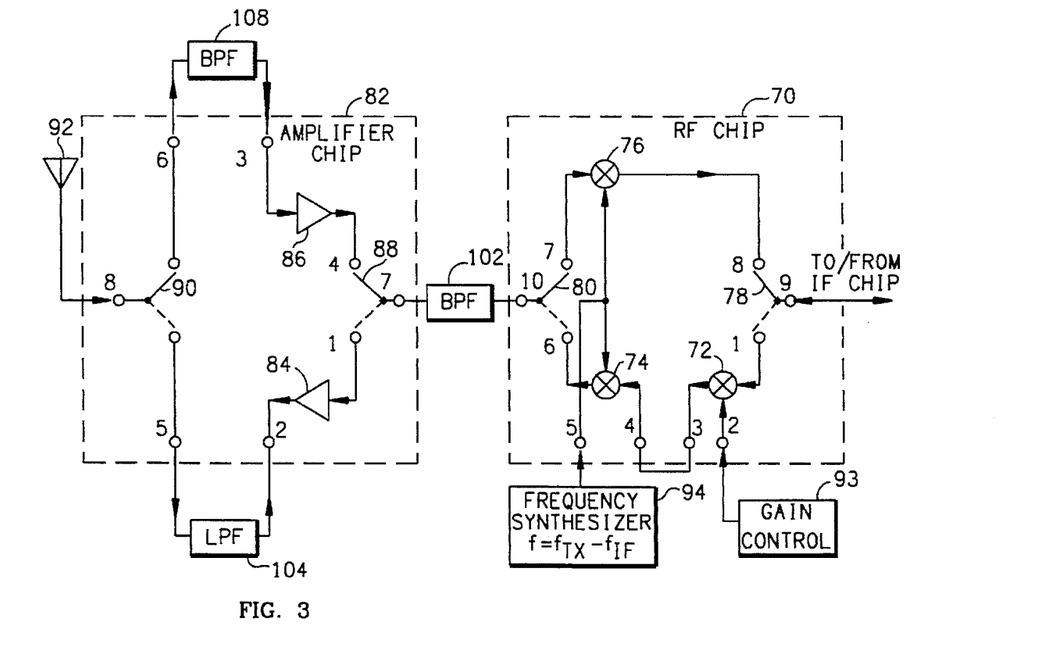
FIG. 3 is a block diagram of a preferred embodiment of a combination of an RF chip and an amplifier/switch chip according to the present invention that is connected for processing TDD transmitted and received signals.
Figure 4:
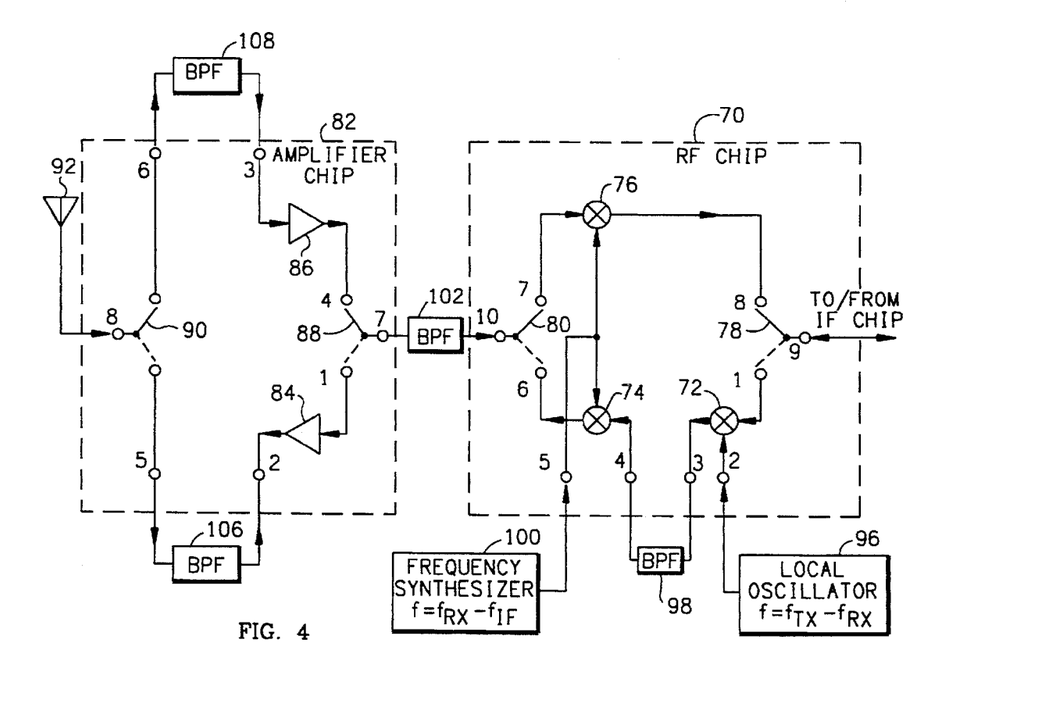
FIG. 4 is a block diagram of a preferred embodiment of a combination of an RF chip and an amplifier/switch chip according to the present invention that is connected for processing TDD transmitted and received signals.

Referring to FIGS. 3 and 4, a preferred embodiment of the RF chip 70 includes a first mixer 72, a second mixer 74, a third mixer 76, a first switch 78, a second switch 80, and ten terminals 1–10.

The first mixer 72 of the RF chip 70 has one input coupled to a first terminal 1 of the RF chip 70, another input coupled to a second terminal 2 of the RF chip and an output coupled to a third terminal 3 of the RF chip.

The second mixer 74 of the RF chip 70 has one input coupled to a fourth terminal 4 of the RF chip, a another input coupled to a fifth terminal 5 of the RF chip and an output coupled to a sixth terminal 6 of the RF chip.

The third mixer 76 of the RF chip 70 has one input coupled to a seventh terminal 7 of the RF chip, another input coupled to the fifth terminal 5 of the RF chip and an output coupled to an eighth terminal 8 of the RF chip.

The first switch 78 of the RF chip 70 enables a first I/O terminal 9 of the RF chip to be connected to either the first terminal 1 of the RF chip 70 or the eighth terminal 8 of the RF chip 70.

The second switch 80 of the RF chip 70 enables a second I/O terminal 10 of the RF chip to be connected to either the sixth terminal 6 of the RF chip 70 or the seventh terminal 7 of the RF chip 70.

The preferred embodiment of the chip set of the present invention further includes an amplifier/switch chip 82. The amplifier/switch chip 82 includes a first amplifier 84, a second amplifier 86, a first switch 88, a second switch 90 and eight terminals 1–8.

The first amplifier 84 has an input coupled to a first terminal 1 of the amplifier/switch chip 82 and an output coupled to a second terminal 2 of the amplifier/switch chip.

The second amplifier 86 has an input coupled to a third terminal 3 of the amplifier/switch chip 82 and an output coupled to a fourth terminal 4 of the amplifier/switch chip.

The first switch 88 of the amplifier/switch chip 82 enables an I/O terminal 7 of the amplifier/switch chip to be connected to either the first terminal 1 of the amplifier/switch chip or the fourth terminal 4 of the amplifier/switch chip.

The second switch 90 of the amplifier/switch chip 82 enables an antenna terminal 8 of the amplifier/switch chip to be connected to either a fifth terminal 5 of the amplifier/switch chip or a sixth terminal 6 of the amplifier/switch chip.

The antenna terminal 8 of the amplifier/switch chip is connected to an antenna 92 for transmitting the input signal at the transmission frequency and for receiving the received signal at the reception frequency.

In order to pass QPSK-modulated input signals at the intermediate frequency from the IF chip 20 to the RF chip 70 when the transmitted and received signals are TDD transmitted and received signals, the I/O terminal 18 of the IF chip is coupled to the first I/O terminal 9 of the RF chip by a bandpass filter (not shown); the first switch 44 of the IF chip 20 connects the I/O terminal 18 of the IF chip to the fifth terminal 5 of the IF chip; and the first switch 78 of the RF chip connects the first I/O terminal 9 of the RF chip to the first terminal 1 of the RF chip to thereby provide the input signal at the intermediate frequency from the output of the first mixer 30 of the IF chip to the input of the first mixer 72 of the RF chip.

In order to pass FSK-modulated input signals at the intermediate frequency from the IF chip 20 to the RF chip 70 when the transmitted and received signals are TDD transmitted and received signals, the third terminal 3 of the IF chip is connected to the first terminal 1 of the KF chip to thereby provide the input signal at the intermediate frequency from the output of the phase-locked oscillator 28 of the IF chip to the input of the first mixer 72 of the RF chip.

In order to pass QPSK-modulated input signals at the intermediate frequency from the IF chip 20 to the RF chip 70 when the transmitted and received signals are FDD transmitted and received signals, the I/O terminal 18 of the IF chip is coupled to the first I/O terminal 9 of the RF chip by a bandpass filter (not shown); the first switch 44 of the IF chip 20 connects the I/O terminal 18 of the IF chip to the fifth terminal 5 of the IF chip; and the first switch 78 of the RF chip connects the first I/O terminal 9 of the RF chip to the first terminal 1 of the KF chip to thereby provide the input signal at the intermediate frequency from the output of the first mixer 30 of the IF chip to the input of the first mixer 72 of the RF chip.

In order to pass FSK-modulated input signals at the intermediate frequency from the IF chip 20 to the RF chip 70 when the transmitted and received signals are FDD transmitted and received signals, the third terminal 3 of the IF chip is connected to the first terminal 1 of the RF chip to thereby provide the input signal at the intermediate frequency from the output of the phase-locked oscillator 28 of the IF chip to the input of the first mixer 72 of the RF chip.

In order to pass either QPSK-modulated or FSK-modulated received signals at the intermediate frequency from the RF chip 70 to the IF chip 20 when the transmitted and received signals are either TDD transmitted and received signals or FDD transmitted and received signals, the I/O terminal 18 of the IF chip is coupled to the first I/O terminal 9 of the RF chip by a bandpass filter (not shown); the first switch 44 of the IF chip 20 connects the I/O terminal 18 of the IF chip to the sixth terminal 6 of the IF chip; and the first switch 78 of the RF chip connects the first I/O terminal 9 of the RF chip to the eighth terminal 8 of the RF chip to thereby provide the received signal at the intermediate frequency from the output of the third mixer 76 of the RF chip to the input of the second mixer 34 of the IF chip. When the received signals are QPSK modulated, the bandpass filter may be the same bandpass filter (not shown) as used for passing input signals from the IF chip 20 to the RF chip 70.

Referring to FIG. 3, in order to enable the RF chip 70 to process an input signal provided at the intermediate frequency to the first terminal 1 of the RF chip 70 when the transmitted and received signals are TDD transmitted and received signals, the second terminal 2 of the RF chip is coupled to the output of a gain control circuit 93, the third terminal 3 of the RF chip is connected to the fourth terminal 4 of the RF chip, and the fifth terminal 5 of the RF chip is coupled to the output of a frequency synthesizer 94 that provides a reference signal having a frequency equal to the difference between the transmission frequency and the intermediate frequency, whereby the RF chip is connected for enabling the second mixer 74 of the RF chip to convert the frequency of the input signal provided at the first terminal 1 of the RF chip to the transmission frequency and provide the input signal at the transmission frequency to the sixth terminal 6 of the RF chip.

Referring to FIG. 4, in order to enable the RF chip 70 to process an input signal provided at the intermediate frequency to the first terminal 1 of the RF chip 70 when the transmitted and received signals are FDD transmitted and received signals, the second terminal 2 of the RF chip is coupled to the output of a local oscillator 96 that provides a reference signal having a frequency equal to the difference between the transmission frequency and the reception frequency, the third terminal 3 of the RF chip is coupled by a bandpass filter 98 to the fourth terminal 4 of the RF chip and the fifth terminal of the RF chip is coupled to the output of a frequency synthesizer 100 that provides a reference signal having a frequency equal to the difference between the reception frequency and the intermediate frequency, whereby the RF chip is connected for enabling the first mixer 72 of the RF chip to change the frequency of the input signal provided at the first terminal 1 of the RF chip by the difference between the transmission frequency and the reception frequency and for enabling the second mixer 74 of the RF chip to convert the frequency of the input signal provided at the output of the first mixer 72 of the RF chip to the transmission frequency and provide the input signal at the transmission frequency to the sixth terminal 6 of the RF chip.

Referring again to both FIGS. 3 and 4, the second I/O terminal 10 of the RF chip 70 is coupled to the I/O terminal 7 of the amplifier/switch chip 82 by a bandpass filter 102.

In order to pass input signals at the transmission frequency from the RF chip 70 to the amplifier/switch chip 82, the second switch 80 of the RF chip connects the second I/O terminal 10 of the RF chip to the sixth terminal 6 of the RF chip and the first switch 88 of the amplifier/switch chip 82 connects the I/O terminal 7 of the amplifier/switch chip to the first terminal 1 of the amplifier/switch chip. This embodiment may used when the transmitted and received signals are either TDD transmitted and received signals or FDD transmitted and received signals. In an alternative embodiment that is used only when the transmitted and received signals are FDD transmitted and received signals, the sixth terminal 6 of the RF chip 70 is coupled by a bandpass filter (not shown) other than the bandpass filter 102 to the first terminal 1 of the amplifier/switch chip 82 in order to pass input signals at the transmission frequency from the RF chip 70 to the amplifier/switch chip 82.

In order to pass received signals at the reception frequency from the amplifier/switch chip 82 to the RF chip 70, the second switch 80 of the RF chip connects the second I/O terminal 10 of the RF chip to the seventh terminal 7 of the RF chip and the first switch 88 of the amplifier/switch chip 82 connects the I/O terminal 7 of the amplifier/switch chip to the fourth terminal 4 of the amplifier/switch chip. This embodiment is used when the transmitted and received signals are either TDD transmitted and received signals or FDD transmitted and received signals.

Referring again to FIG. 3, in order to enable the RF chip 70 to process a received signal provided to the seventh terminal 7 of RF chip at the reception frequency when the transmitted and received signals are either TDD transmitted and received signals, the fifth terminal 5 of the RF chip is connected to the output of the frequency synthesizer 94 that provides a reference signal having a frequency equal to the difference between the transmission frequency and the intermediate frequency, whereby the RF chip is connected for enabling the third mixer 76 of the RF chip to mix the reference signal with the received signal at the reception frequency to down convert the frequency of the received signal from the reception frequency to the intermediate frequency and provide the received signal at the intermediate frequency to the eighth terminal 8 of the RF chip.

Referring again to FIG. 4, in order to enable the RF chip 70 to process a received signal provided to the seventh terminal 7 of RF chip at the reception frequency when the transmitted and received signals are either FDD transmitted and received signals, the fifth terminal 5 of the RF chip is connected to the output of the frequency synthesizer 100 that provides a reference signal having a frequency equal to the difference between the reception frequency and the intermediate frequency, whereby the RF chip is connected for enabling the third mixer 76 of the RF chip to mix the reference signal with the received signal at the reception frequency to down convert the frequency of the received signal from the reception frequency to the intermediate frequency and provide the received signal at the intermediate frequency to the eighth terminal 8 of the RF chip.

Referring once again to FIG. 3, in order to enable the amplifier/switch chip 82 to process an input signal provided at the transmission frequency to the first terminal 1 of the amplifier/switch chip 82 when the transmitted and received signals are TDD transmitted and received signals, the second terminal 2 of the amplifier/switch chip is coupled by a bandpass filter 104 to the fifth terminal 5 of the amplifier/switch chip and the switch 90 couples the antenna terminal 8 to the fifth terminal 5 of the amplifier/switch chip, whereby the amplifier/switch chip 82 is connected for enabling the first amplifier 84 to amplify the input signal provided from the RF chip 70 to the first terminal 1 of the amplifier/switch chip at the transmission frequency and provide the amplified signal to the antenna 92 for transmission.

Referring once again to FIG. 4, in order to enable the amplifier/switch chip 82 to process an input signal provided at the transmission frequency to the first terminal 1 of the amplifier/switch chip 82 when the transmitted and received signals are FDD transmitted and received signals, the second terminal 2 of the amplifier/switch chip is coupled by a low pass filter 106 to the fifth terminal 5 of the amplifier/switch chip and the switch 90 couples the antenna terminal 8 to the fifth terminal 5 of the amplifier/switch chip, whereby the amplifier/switch chip 82 is connected for enabling the first amplifier 84 to amplify the input signal provided from the RF chip 70 to the first terminal 1 of the amplifier/switch chip at the transmission frequency and provide the amplified signal to the antenna 92 for transmission.

Referring once again to both FIGS. 3 and 4, in order to enable the amplifier/switch chip 82 to process a received signal provided at the reception frequency to the antenna terminal 8 of the amplifier/switch chip 82 by the antenna 92 when the transmitted and received signals are either TDD transmitted and received signals or FDD transmitted and received signals, the sixth terminal 6 of the amplifier/switch chip is coupled by a bandpass filter 108 to the third terminal 3 of the amplifier/switch chip and the switch 90 couples the antenna terminal 8 to the sixth terminal 6 of the amplifier/switch chip, whereby the amplifier/switch chip 82 is connected for enabling the second amplifier 86 to amplify the received signal provided by the antenna 92 at the reception frequency and provide the amplified received signal to the fourth terminal 4 of the amplifier/switch chip.

In an alternative embodiment described with reference to FIGS. 2, 3 and 4, in order to enable the IF chip 20 to process an FSK-modulated digital input signal provided to the seventeenth terminal 17 of the IF chip when the modulation of the digital input signal is FSK, the frequency synthesizer 100 is tuned for providing an output signal at a reference frequency equal to either the difference between the intermediate frequency and the transmission frequency (for TDD/FIG. 3) or the difference between the intermediate frequency and the reception frequency (for FDD)/FIG. 4), the first terminal 1 of the IF chip is coupled by a low-pass filter (not shown) to the frequency synthesizer 100 for enabling the frequency synthesizer to be modulated with the analog input signal from the output of the DAC 22 and the output of the frequency synthesizer 100 is connected to the fifth terminal 5 of the RF chip 70, whereby the IF chip, the RF chip and the frequency synthesizer are connected for providing the modulated input signal at the transmission frequency from the output of the second mixer 74 of the RF chip to the sixth terminal of the RF chip. The frequency synthesizer 100 is modulated with the analog input signal only during the transmission mode of operation.

While the above description contains many specificities, these should not be construed as limitations on the scope of the present invention, but rather as exemplifications of the preferred embodiments described herein. Other variations are possible and the scope of the present invention should be determined not by the embodiments described herein but rather by the claims and their legal equivalents.

We claim:

1. An integrated circuit chip set for use in a radio communication system in which a modulated digital input signal is processed for transmission and a modulated signal received from an antenna is processed to provide an output signal, wherein the modulation of the signals is either quadrature phase shift keying (QPSK) or frequency shift keying (FSK) and the signal transmission and reception is by either time-division duplex (TDD) or frequency-division duplex (FDD), the chip set comprising an intermediate frequency (IF) integrated circuit chip for processing a digital input signal to convert the digital input signal into an analog input signal and to provide the input signal at an intermediate frequency and for processing a received signal at the intermediate frequency to down convert the frequency thereof and to provide an output signal from the down-converted received signal; and a radio frequency (RF) integrated circuit chip for processing the input signal provided by the IF chip at the intermediate frequency to up convert the frequency thereof to a transmission frequency and for processing a received signal provided at the reception frequency to down convert the frequency thereof to the intermediate frequency;

wherein the IF chip and the RF chip in combination include means for providing the input signal at said intermediate frequency when the modulation of the digital input signal is QPSK modulated and for providing the input signal at said intermediate frequency and/or at the transmission frequency when the modulation of the digital input signal is FSK modulated; and means for sampling the down-converted received signal to provide said output signal when the down-converted received signal is QPSK modulated and for demodulating the down-converted received signal to provide said output signal when the down-converted received signal is FSK modulated; and wherein the IF chip includes switches and terminals for enabling the IF chip to be connected for said processing by the IF chip of QPSK-modulated signals or to be connected for said processing by the IF chip of FSK-modulated signals; and wherein the RF chip includes terminals for enabling the RF chip to be connected for said processing by the RF chip of TDD transmitted and received signals or to be connected for said processing by the RF chip of FDD transmitted and received signals.

2. A chip set according to claim 1, wherein the IF chip includes a digital-to-analog converter (DAC) for converting the digital input signal into the analog input signal, wherein the output of the DAC is coupled to a first terminal of the IF chip;

a phase-locked loop including a phase-locked oscillator, wherein the input of the phase-locked oscillator is coupled to a second terminal of the IF chip and the output of the phase-locked oscillator is coupled to a third terminal of the IF chip; and a first mixer having one input coupled to the output of the phase-locked oscillator, a second input coupled to a fourth terminal of the IF chip and an output connected to a fifth terminal of the IF chip;

wherein when the modulation of the digital input signal is QPSK and the first terminal is coupled to the fourth terminal for enabling the first mixer to mix the output of the phase-locked oscillator with the analog input signal, the IF chip is connected for providing to the fifth terminal the input signal at said intermediate frequency; and wherein when the modulation of the digital input signal is FSK and the first terminal is connected to the second terminal for enabling the input of the phase-locked oscillator to be modulated with the analog input signal, the IF chip is connected for providing the input signal from the output of the phase-locked oscillator to the third terminal at said intermediate frequency.

3. A chip set according to claim 2, wherein the IF chip further includes a second mixer having one input coupled to a sixth terminal of the IF chip, another input coupled to the output of the phase-locked oscillator and an output coupled to a seventh terminal of the IF chip;

a third mixer having one input coupled to an eighth terminal of the IF chip, another input coupled to a ninth input terminal and an output coupled to a tenth terminal of the IF chip;

a limiting amplifier having an input coupled to an eleventh terminal of the IF chip and an output coupled to a twelfth terminal of the IF chip; and a sampling circuit having an input connected to a thirteenth terminal of the IF chip and an output connected to a fourteenth terminal of the IF chip;

wherein when the sixth terminal is coupled to the RF chip for receiving the received signal at the intermediate frequency, the second mixer down converts the frequency of the received signal from the intermediate frequency;

wherein when the down-converted received signal is QPSK modulated, the seventh terminal is coupled to the eighth terminal, the ninth terminal is coupled to a reference-frequency signal source, the tenth terminal is coupled to the eleventh terminal and the twelfth terminal is coupled to the thirteenth terminal, the IF chip is connected for sampling the down-converted received signal and for providing the sampled signal at the fourteenth terminal; and wherein when the down-converted received signal is FSK modulated, the seventh terminal is coupled to the eleventh terminal and the twelfth terminal is coupled to the eighth terminal through a phase-shifting means and connected directly to the ninth terminal, the IF chip is connected for demodulating the down-converted received signal and for providing the demodulated signal at the tenth terminal.

4. A chip set according to claim 3, wherein the RF chip includes a first mixer having one input coupled to a first terminal of the RF chip, another input coupled to a second terminal of the RF chip and an output coupled to a third terminal of the RF chip; and a second mixer having one input coupled to a fourth terminal of the RF chip, a another input coupled to a fifth terminal of the RF chip and an output coupled to a sixth terminal of the RF chip;

wherein when the transmitted and received signals are TDD transmitted and received signals, the first terminal of the RF chip is coupled to the IF chip for receiving the input signal provided by the IF chip at the intermediate frequency, the second terminal of the RF chip is coupled to a gain control circuit, the third terminal of the RF chip is coupled to the fourth terminal of the RF chip, and the fifth terminal of the RF chip is coupled to a source of a reference signal having a frequency equal to the difference between the transmission frequency and the intermediate frequency, the RF chip is connected for converting the frequency of the input signal provided by the IF chip to the transmission frequency and for providing the input signal at the transmission frequency at the sixth terminal of the RF chip; and wherein when the transmitted and received signals are FDD transmitted and received signals, the first terminal of the RF chip is coupled to the IF chip for receiving the input signal provided by the IF chip at the intermediate frequency, the second terminal of the RF chip is coupled to a source of a reference signal having a frequency equal to the difference between the frequencies of the transmitted signal and the signal received by the antenna, the third terminal of the RF chip is coupled to the fourth terminal of the RF chip and the fifth terminal of the RF chip is coupled to a source of a reference signal having a frequency equal to the difference between the reception frequency and the intermediate frequency, the RF chip is connected for converting the frequency of the input signal provided by the IF chip to the transmission frequency and for providing the input signal at the transmission frequency at the sixth terminal of the RF chip.

5. A chip set according to claim 4, wherein the RF chip further includes a third mixer having one input coupled to an seventh terminal of the RF chip, another input coupled to the fifth terminal of the RF chip and an output coupled to an eighth terminal of the RF chip;

wherein when the seventh terminal receives said received signal at the reception frequency, the fifth terminal of the RF chip is coupled to the source of the reference signal having a frequency equal to the difference between the transmission frequency and the intermediate frequency and the transmitted and received signals are TDD transmitted and received signals, the RF chip is connected for converting the frequency of the received signal from the reception frequency to the intermediate frequency and for providing the received signal at the intermediate frequency at the eighth terminal of the RF chip; and wherein when the seventh terminal receives said received signal at the reception frequency, the fifth terminal of the RF chip is coupled to the source of the reference signal having a frequency equal to the difference between the reception frequency and the intermediate frequency and the transmitted and received signals are FDD transmitted and received signals, the RF chip is connected for converting the frequency of the received signal from the reception frequency to the intermediate frequency and for providing the received signal at the intermediate frequency at the eighth terminal of the RF chip.

6. A chip set according to claim 5, further comprising an amplifier/switch chip, including a first amplifier having an input coupled to a first terminal of the amplifier/switch chip and an output coupled to a second terminal of the amplifier/switch chip;

a second amplifier having an input coupled to a third terminal of the amplifier/switch chip and an output coupled to a fourth terminal of the amplifier/switch chip;

an antenna terminal; and a switch for coupling the antenna terminal to either a fifth terminal of the amplifier/switch chip or a sixth terminal of the amplifier/switch chip;

wherein when the transmitted and received signals are TDD transmitted and received signals, the first terminal of the amplifier/switch chip is coupled to the sixth terminal of the RF chip for receiving the input signal provided by the RF chip at the transmission frequency, the second terminal of the amplifier/switch chip is coupled by a low-pass filter to the fifth terminal of the amplifier/switch chip and the switch couples the antenna terminal to the fifth terminal of the amplifier/switch chip, the amplifier/switch chip is connected for amplifying the input signal provided by the RF chip at the transmission frequency and for providing the amplified signal to the antenna terminal for transmission;

wherein when the transmitted and received signals are FDD transmitted and received signals, the first terminal of the amplifier/switch chip is coupled to the sixth terminal of the RF chip for receiving the input signal provided by the RF chip at the transmission frequency, the second terminal of the amplifier/switch chip is coupled by a bandpass filter to the fifth terminal of the amplifier/switch chip and the switch couples the antenna terminal to the fifth terminal of the amplifier/switch chip, the amplifier/switch chip is connected for amplifying the input signal provided by the RF chip at the transmission frequency and for providing the amplified signal to the antenna terminal for transmission; and wherein when the received signals are either TDD transmitted and received signals or FDD transmitted and received signals, the switch couples the antenna terminal to the sixth terminal of the amplifier/switch chip and the sixth terminal of the amplifier/switch chip is coupled by a bandpass filter to the third terminal of the amplifier/switch chip, the amplifier/switch chip is connected for amplifying the signal provided by the antenna at the reception frequency and for providing the signal amplified by the second amplifier to the fourth terminal of the RF chip.

7. A chip set according to claim 1, wherein the IF chip further includes a first mixer having one input coupled to a sixth terminal of the IF chip, another input coupled to the output of the phase-locked oscillator and an output coupled to a seventh terminal of the IF chip;

a second mixer having one input coupled to an eighth terminal of the IF chip, another input coupled to a ninth input terminal and an output coupled to a tenth terminal of the IF chip;

a limiting amplifier having an input coupled to an eleventh terminal of the IF chip and an output coupled to a twelfth terminal of the IF chip; and a sampling circuit having an input connected to a thirteenth terminal of the IF chip and an output connected to a fourteenth terminal of the IF chip;

wherein when the sixth terminal is coupled to the RF chip for receiving the received signal at the intermediate frequency, the second mixer down converts the frequency of the received signal from the intermediate frequency;

wherein when the down-converted received signal is QPSK modulated, the seventh terminal is coupled to the eighth terminal, the ninth terminal is coupled to a reference-frequency signal source, the tenth terminal is coupled to the eleventh terminal and the twelfth terminal is coupled to the thirteenth terminal, the IF chip is connected for sampling the down-converted received signal and for providing the sampled signal at the fourteenth terminal; and wherein when the down-converted received signal is FSK modulated, the seventh terminal is coupled to the eleventh terminal and the twelfth terminal is coupled to the eighth terminal through a phase-shifting means and connected directly to the ninth terminal, the IF chip is connected for demodulating the down-converted received signal and for providing the demodulated signal at the tenth terminal.

8. A chip set according to claim 1, wherein the RF chip includes a first mixer having one input coupled to a first terminal of the RF chip, another input coupled to a second terminal of the RF chip and an output coupled to a third terminal of the RF chip; and a second mixer having one input coupled to a fourth terminal of the RF chip, a another input coupled to a fifth terminal of the RF chip and an output coupled to a sixth terminal of the RF chip;

wherein when the transmitted and received signals are TDD transmitted and received signals, the first terminal of the RF chip is coupled to the IF chip for receiving the input signal provided by the IF chip at the intermediate frequency, the second terminal of the RF chip is coupled to a gain control circuit, the third terminal of the RF chip is coupled to the fourth terminal of the RF chip, and the fifth terminal of the RF chip is coupled to a source of a reference signal having a frequency equal to the difference between the transmission frequency and the intermediate frequency, the RF chip is connected for converting the frequency of the input signal provided by the IF chip to the transmission frequency and for providing the input signal at the transmission frequency at the sixth terminal of the RF chip; and wherein when the transmitted and received signals are FDD transmitted and received signals, the first terminal of the RF chip is coupled to the IF chip for receiving the input signal provided by the IF chip at the intermediate frequency, the second terminal of the RF chip is coupled to a source of a reference signal having a frequency equal to the difference between the frequencies of the transmitted signal and the signal received by the antenna, the third terminal of the RF chip is coupled to the fourth terminal of the RF chip and the fifth terminal of the RF chip is coupled to a source of a reference signal having a frequency equal to the difference between the reception frequency and the intermediate frequency, the RF chip is connected for converting the frequency of the input signal provided by the IF chip to the transmission frequency and for providing the input signal at the transmission frequency at the sixth terminal of the RF chip.

9. A chip set according to claim 8, wherein the RF chip further includes a third mixer having one input coupled to an seventh terminal of the RF chip, another input coupled to the fifth terminal of the RF chip and an output coupled to an eighth terminal of the RF chip;

wherein when the seventh terminal receives said received signal at the reception frequency, the fifth terminal of the RF chip is coupled to the source of the reference signal having a frequency equal to the difference between the transmission frequency and the intermediate frequency and the transmitted and received signals are TDD transmitted and received signals, the RF chip is connected for converting the frequency of the received signal from the reception frequency to the intermediate frequency and for providing the received signal at the intermediate frequency at the eighth terminal of the RF chip; and wherein when the seventh terminal receives said received signal at the reception frequency, the fifth terminal of the RF chip is coupled to the source of the reference signal having a frequency equal to the difference between the reception frequency and the intermediate frequency and the transmitted and received signals are FDD transmitted and received signals, the RF chip is connected for converting the frequency of the received signal from the reception frequency to the intermediate frequency and for providing the received signal at the intermediate frequency at the eighth terminal of the RF chip.

10. A chip set according to claim 9, further comprising an amplifier/switch chip, including a first amplifier having an input coupled to a first terminal of the amplifier/switch chip and an output coupled to a second terminal of the amplifier/switch chip;

a second amplifier having an input coupled to a third terminal of the amplifier/switch chip and an output coupled to a fourth terminal of the amplifier/switch chip;

an antenna terminal; and a switch for coupling the antenna terminal to either a fifth terminal of the amplifier/switch chip or a sixth terminal of the amplifier/switch chip;

wherein when the transmitted and received signals are TDD transmitted and received signals, the first terminal of the amplifier/switch chip is coupled to the sixth terminal of the RF chip for receiving the input signal provided by the RF chip at the transmission frequency, the second terminal of the amplifier/switch chip is coupled by a low-pass filter to the fifth terminal of the amplifier/switch chip and the switch couples the antenna terminal to the fifth terminal of the amplifier/switch chip, the amplifier/switch chip is connected for amplifying the input signal provided by the RF chip at the transmission frequency and for providing the amplified signal to the antenna terminal for transmission;

wherein when the transmitted and received signals are FDD transmitted and received signals, the first terminal of the amplifier/switch chip is coupled to the sixth terminal of the RF chip for receiving the input signal provided by the RF chip at the transmission frequency, the second terminal of the amplifier/switch chip is coupled by a bandpass filter to the fifth terminal of the amplifier/switch chip and the switch couples the antenna terminal to the fifth terminal of the amplifier/switch chip, the amplifier/switch chip is connected for amplifying the input signal provided by the RF chip at the transmission frequency and for providing the amplified signal to the antenna terminal for transmission; and wherein when the received signals are either TDD transmitted and received signals or FDD transmitted and received signals, the switch couples the antenna terminal to the sixth terminal of the amplifier/switch chip and the sixth terminal of the amplifier/switch chip is coupled by a bandpass filter to the third terminal of the amplifier/switch chip, the amplifier/switch chip is connected for amplifying the signal provided by the antenna at the reception frequency and for providing the signal amplified by the second amplifier to the fourth terminal of the RF chip.

11. A chip set according to claim 1 in combination with a frequency synthesizer, wherein the IF chip includes a digital-to-analog converter (DAC) for converting the digital input signal into the analog input signal, wherein the output of the DAC is coupled to a first terminal of the IF chip;

a phase-locked loop including a phase-locked oscillator, wherein the input of the phase-locked oscillator is coupled to a second terminal of the IF chip and the output of the phase-locked oscillator is coupled to a third terminal of the IF chip; and a first mixer having one input coupled to the output of the phase-locked oscillator, a second input coupled to a fourth terminal of the IF chip and an output connected to a fifth terminal of the IF chip;

wherein the RF chip includes a first mixer having one input coupled to a first terminal of the RF chip, another input coupled to a second terminal of the RF chip and an output coupled to a third terminal of the RF chip; and a second mixer having one input coupled to a fourth terminal of the RF chip, a another input coupled to a fifth terminal of the RF chip and an output coupled to a sixth terminal of the RF chip;

wherein when the modulation of the digital input signal is QPSK and the first terminal is coupled to the fourth terminal for enabling the first mixer to mix the output of the phase-locked oscillator with the analog input signal, the IF chip is connected for providing to the fifth terminal the input signal at said intermediate frequency; and wherein when the modulation of the digital input signal is FSK, the frequency synthesizer is tuned for providing an output signal at a reference frequency, the first terminal of the IF chip is connected to the frequency synthesizer for enabling the frequency synthesizer to be modulated with the analog input signal and the output of the frequency synthesizer is connected to the fifth terminal of the RF chip, the IF chip, the RF chip and the frequency synthesizer are connected for providing the modulated input signal at the transmission frequency from the output of the second mixer of the RF chip.

12. An intermediate frequency (IF) integrated circuit chip for use in a radio communication system in which a modulated digital input signal is processed for transmission and a signal received from an antenna is processed to provide a demodulated output signal, wherein the modulation of the digital input signal is either quadrature phase shift keying (QPSK) or frequency shift keying (FSK), wherein the chip is adapted for processing a digital input signal to convert the digital input signal into an analog input signal and to provide the input signal at an intermediate frequency and for processing a received signal at the intermediate frequency to down convert the frequency thereof and to provide an output signal from the down-converted received signal, the chip comprising means for providing the input signal at said intermediate frequency when the modulation of the digital input signal is QPSK modulated and for providing the input signal at said intermediate frequency when the modulation of the digital input signal is FSK modulated;

means for sampling the down-converted received signal to provide said output signal when the down-converted received signal is QPSK modulated and for demodulating the down-converted received signal to provide said output signal when the down-converted received signal is FSK modulated; and switches and terminals for enabling the IF chip to be connected for said processing by the IF chip of QPSK-modulated signals or to be connected for said processing by the IF chip of FSK-modulated signals.

13. An IF chip according to claim 12, comprising a digital-to-analog converter (DAC) for converting the digital input signal into the analog input signal, wherein the output of the DAC is coupled to a first terminal of the IF chip;

a phase-locked loop including a phase-locked oscillator, wherein the input of the phase-locked oscillator is coupled to a second terminal of the IF chip and the output of the phase-locked oscillator is coupled to a third terminal of the IF chip; and a first mixer having one input coupled to the output of the phase-locked oscillator, a second input coupled to a fourth terminal of the IF chip and an output connected to a fifth terminal of the IF chip;

wherein when the modulation of the digital input signal is QPSK and the first terminal is coupled to the fourth terminal for enabling the first mixer to mix the output of the phase-locked oscillator with the analog input signal, the IF chip is connected for providing to the fifth terminal the input signal at said intermediate frequency; and wherein when the modulation of the digital input signal is FSK and the first terminal is connected to the second terminal for enabling the input of the phase-locked oscillator to be modulated with the analog input signal, the IF chip is connected for providing the input signal from the output of the phase-locked oscillator to the third terminal at said intermediate frequency.

14. An IF chip according to claim 13, further comprising a second mixer having one input coupled to a sixth terminal of the IF chip, another input coupled to the output of the phase-locked oscillator and an output coupled to a seventh terminal of the IF chip;

a third mixer having one input coupled to an eighth terminal of the IF chip, another input coupled to a ninth input terminal and an output coupled to a tenth terminal of the IF chip;

a limiting amplifier having an input coupled to an eleventh terminal of the IF chip and an output coupled to a twelfth terminal of the IF chip; and a sampling circuit having an input connected to a thirteenth terminal of the IF chip and an output connected to a fourteenth terminal of the IF chip;

wherein when the sixth terminal receives the received signal at the intermediate frequency, the second mixer down converts the frequency of the received signal from the intermediate frequency;

wherein when the down-converted received signal is QPSK modulated, the seventh terminal is coupled to the eighth terminal, the ninth terminal is coupled to a reference-frequency signal source, the tenth terminal is coupled 16 the eleventh terminal and the twelfth terminal is coupled to the thirteenth terminal, the IF chip is connected for sampling the down-converted received signal and for providing the sampled signal at the fourteenth terminal; and wherein when the down-converted received signal is FSK modulated, the seventh terminal is coupled to the eleventh terminal and the twelfth terminal is coupled to the eighth terminal through a phase-shifting means and connected directly to the ninth terminal, the IF chip is connected for demodulating the down-converted received signal and for providing the demodulated signal at the tenth terminal.

15. An IF chip according to claim 12, further comprising a first mixer having one input coupled to a sixth terminal of the IF chip, another input coupled to the output of the phase-locked oscillator and an output coupled to a seventh terminal of the IF chip;

a second mixer having one input coupled to an eighth terminal of the IF chip, another input coupled to a ninth input terminal and an output coupled to a tenth terminal of the IF chip;

a limiting amplifier having an input coupled to an eleventh terminal of the IF chip and an output coupled to a twelfth terminal of the IF chip; and a sampling circuit having an input connected to a thirteenth terminal of the IF chip and an output connected to a fourteenth terminal of the IF chip;

wherein when the sixth terminal receives the received signal at the intermediate frequency, the second mixer down converts the frequency of the received signal from the intermediate frequency;

wherein when the down-converted received signal is QPSK modulated, the seventh terminal is coupled to the eighth terminal, the ninth terminal is coupled to a reference-frequency signal source, the tenth terminal is coupled to the eleventh terminal and the twelfth terminal is coupled to the thirteenth terminal, the IF chip is connected for sampling the down-converted received signal and for providing the sampled signal at the fourteenth terminal; and wherein when the down-converted received signal is FSK modulated, the seventh terminal is coupled to the eleventh terminal and the twelfth terminal is coupled to the eighth terminal through a phase-shifting means and connected directly to the ninth terminal, the IF chip is connected for. demodulating the down-converted received signal and for providing the demodulated signal at the tenth terminal.

16. A radio frequency (RF) integrated circuit chip set for use in a radio communication system in which a modulated digital input signal is processed for transmission and a signal received from an antenna is processed to provide a demodulated output signal, wherein the signal transmission and reception is by either time-division duplex (TDD) or frequency-division duplex (FDD), the chip comprising means for processing an input signal provided at the intermediate frequency to up convert the frequency thereof to a transmission frequency and for processing a received signal provided at the reception frequency to down convert the frequency thereof to the intermediate frequency; and terminals for enabling the chip to be connected for said processing of TDD transmitted and received signals or to be connected for said processing of FDD transmitted and received signals.

17. An RF chip according to claim 16, comprising a first mixer having one input coupled to a first terminal of the RF chip, another input coupled to a second terminal of the RF chip and an output coupled to a third terminal of the RF chip; and a second mixer having one input coupled to a fourth terminal of the RF chip, a another input coupled to a fifth terminal of the RF chip and an output coupled to a sixth terminal of the RF chip;

wherein when the transmitted and received signals are TDD transmitted and received signals, the first terminal of the RF chip receives an input signal at the intermediate frequency, the second terminal of the RF chip is coupled to a gain control circuit, the third terminal of the RF chip is coupled to the fourth terminal of the RF chip, and the fifth terminal of the RF chip is coupled to a source of a reference signal having a frequency equal to the difference between the transmission frequency and the intermediate frequency, the RF chip is connected for converting the frequency of the input signal to the transmission frequency and for providing the input signal at the transmission frequency at the sixth terminal of the RF chip; and wherein when the transmitted and received signals are FDD transmitted and received signals, the first terminal of the RF chip receives an input signal at the intermediate frequency, the second terminal of the RF chip is coupled to a source of a reference signal having a frequency equal to the difference between the frequencies of the transmitted signal and the signal received by the antenna, the third terminal of the RF chip is coupled to the fourth terminal of the RF chip and the fifth terminal of the RF chip is coupled to a source of a reference signal having a frequency equal to the difference between the reception frequency and the intermediate frequency, the RF chip is connected for converting the frequency of the input signal provided at the intermediate frequency to the transmission frequency and for providing the input signal at the transmission frequency at the sixth terminal of the RF chip.

18. An RF chip according to claim 17, further comprising a third mixer having one input coupled to an seventh terminal of the RF chip, another input coupled to the fifth terminal of the RF chip and an output coupled to an eighth terminal of the RF chip;

wherein when the seventh terminal receives said received signal at the reception frequency, the fifth terminal of the RF chip is coupled to the source of the reference signal having a frequency equal to the difference between the transmission frequency and the intermediate frequency and the transmitted and received signals are TDD transmitted and received signals, the RF chip is connected for converting the frequency of the received signal from the reception frequency to the intermediate frequency and for providing the received signal at the intermediate frequency at the eighth terminal of the RF chip; and wherein when the seventh terminal receives said received signal at the reception frequency, the fifth terminal of the RF chip is coupled to the source of the reference signal having a frequency equal to the difference between the reception frequency and the intermediate frequency and the transmitted and received signals are FDD transmitted and received signals, the RF chip is connected for converting the frequency of the received signal from the reception frequency to the intermediate frequency and for providing the received signal at the intermediate frequency at the eighth terminal of the RF chip.

19. A chip set according to claim 18, in combination with an amplifier/switch chip that comprises a first amplifier having an input coupled to a first terminal of the amplifier/switch chip and an output coupled to a second terminal of the amplifier/switch chip;

a second amplifier having an input coupled to a third terminal of the amplifier/switch chip and an output coupled to a fourth terminal of the amplifier/switch chip;

an antenna terminal; and a switch for coupling the antenna terminal to either a fifth terminal of the amplifier/switch chip or a sixth terminal of the amplifier/switch chip;

wherein when the transmitted and received signals are TDD transmitted and received signals, the first terminal of the amplifier/switch chip is coupled to the sixth terminal of the RF chip for receiving the input signal provided by the RF chip at the transmission frequency, the second terminal of the amplifier/switch chip is coupled by a low-pass filter to the fifth terminal of the amplifier/switch chip and the switch couples the antenna terminal to the fifth terminal of the amplifier/switch chip, the amplifier/switch chip is connected for amplifying the input signal provided by the RF chip at the transmission frequency and for providing the amplified signal to the antenna terminal for transmission;

wherein when the transmitted and received signals are FDD transmitted and received signals, the first terminal of the amplifier/switch chip is coupled to the sixth terminal of the RF chip for receiving the input signal provided by the RF chip at the transmission frequency, the second terminal of the amplifier/switch chip is coupled by a bandpass filter to the fifth terminal of the amplifier/switch chip and the switch couples the antenna terminal to the fifth terminal of the amplifier/switch chip, the amplifier/switch chip is connected for amplifying the input signal provided by the RF chip at the transmission frequency and for providing the amplified signal to the antenna terminal for transmission; and wherein when the received signals are either TDD transmitted and received signals or FDD transmitted and received signals, the switch couples the antenna terminal to the sixth terminal of the amplifier/switch chip and the sixth terminal of the amplifier/switch chip is coupled by a bandpass filter to the third terminal of the amplifier/switch chip, the amplifier/switch chip is connected for amplifying the signal provided by the antenna at the reception frequency and for providing the signal amplified by the second amplifier to the fourth terminal of the RF chip.

* * * * *

UNITED STATES PATENT AND TRADEMARK OFFICE
CERTIFICATE OF CORRECTION

PATENT NO. : 5,648,985
DATED : July 15, 1997
INVENTOR(S) : Bjorn E. Bjerede et al.

It is certified that error appears in the above-indentified patent and that said Letters Patent is hereby corrected as shown below:

Column 5, line 57, "KF" should read --RF--.

Column 6, line 3, "KF" should read --RF--.

Signed and Sealed this

Twenty-first Day of October 1997

Attest:

BRUCE LEHMAN

Attesting Officer     Commissioner of Patents and Trademarks